United States Patent [19]

Akao

[11] Patent Number: 4,907,219
[45] Date of Patent: Mar. 6, 1990

[54] DUPLEX COMMUNICATION WIRELESS

[75] Inventor: Kazutoshi Akao, Tokyo, Japan

[73] Assignee: Kabushiki Kaisha Gakushu Kenyusha, Tokyo, Japan

[21] Appl. No.: 222,108

[22] Filed: Jul. 20, 1988

[30] Foreign Application Priority Data

Sep. 29, 1987 [JP] Japan ................. 62-244944

[51] Int. Cl.$^4$ ................. H04B 1/50; H04L 5/14
[52] U.S. Cl. ................. 370/30; 370/32; 370/38
[58] Field of Search ................. 370/24, 30, 32, 38; 455/86

[56] References Cited

U.S. PATENT DOCUMENTS 4,212,013 7/1980 Biethan et al. ................. 370/30
4,231,116 10/1980 Sekiguchi et al. ................. 370/30
4,685,099 8/1987 White et al. ................. 370/32

FOREIGN PATENT DOCUMENTS 61-109328 1/1986 Japan.

Primary Examiner—Robert L. Griffin
Assistant Examiner—Wellington Chin
Attorney, Agent, or Firm—Lowe, Price, LeBlanc, Becker & Shur

[57] ABSTRACT

A duplex communication wireless apparatus of the type wherein the sum or difference component of a transmission frequency f1 and a reception frequency f2 becomes an intermediate frequency of a receiver. The apparatus includes an input/output resonance circuit exhibiting resonance substantially with said transmission frequency f1 and said reception frequency f2; and a reception input circuit adapted to receive simultaneously both a transmission signal at the transmission frequency f1 from a transmitter and a reception signal at the reception frequency f2 supplied through said input/output resonance circuit for conversion into an intermediate frequency component signal of $|f1 \pm 52|$ and to produce an output.

8 Claims, 3 Drawing Sheets

DUPLEX COMMUNICATION WIRELESS

BACKGROUND OF THE INVENTION

1. Field of the Invention

This invention relates to a duplex communication wireless, and more particularly to a duplex communication wireless for use in a relatively short range of the type wherein the sum or difference component between a transmission frequency and a reception frequency is an intermediate frequency of a receiver.

2. Description of the Prior Art

An example of a duplex communication wireless is disclosed in Japanese Patent Laid-Open No. 109328/1986. This prior art discloses a circuit construction wherein part of the transmission signal outputted from a modulator disposed in a transmitter is supplied to a frequency mixer disposed in a receiver, and a reception signal which is received by an antenna and amplified by a high frequency amplifier is supplied to the frequency mixer in order to extract a signal of an intermediate frequency component obtained as the difference signal between the transmission frequency and the reception signal through the frequency mixer and a band-pass filter, and to reproduce a signal wave by demodulating the signal of this intermediate frequency component. In the duplex communication wireless of the kind described above, a duplex filter (hereinafter referred to as a "filter") is disposed between the antenna and the receiver so as to prevent the high output transmission signal supplied from the transmitter to the antenna from mixing with the reception signal received by the antenna and flowing into the receiver, as is obvious from the reference described above.

However, in the duplex communication wireless having the construction described above, a crystal filter having excellent frequency characteristics is necessary as the filter described above and since a frequency mixer consisting generally of active devices is necessary, it is difficult to reduce the production cost, size and weight of the wireless. Particularly in the case of a duplex communication wireless for a short range communication such as a toy-like wireless, the filter and frequency mixer described above render a critical problem for reducing the production cost, size and weight of the wireless.

SUMMARY OF THE INVENTION

In a duplex communication wireless of the type wherein the sum or difference component between a transmission frequency $f_1$ and a reception frequency $f_2$ becomes the intermediate frequency of the receiver, the duplex communication wireless in accordance with the present invention is characterized by including an input-/output resonance circuit which exhibits substantially the resonance characteristics to both the transmission frequency $f_1$ and the reception frequency $f_2$ and a reception input circuit inputting simultaneously the transmission signal of the transmission frequency $f_1$ outputted from the transmitter and the reception signal of the reception frequency $f_2$ supplied through the input/output resonance circuit described above, converting them to signals of the intermediate frequency components $|f_1 \pm f_2|$ and outputting them.

According to the duplex communication wireless as described above, the transmission signal of the transmission frequency $f_1$ outputted from the transmitter and the reception signal of the reception frequency $f_2$ supplied through the input/output circuit are supplied to the reception input circuit so as to extract the signal of the intermediate frequency component $|f_1 \pm f_2|$. Therefore, a filter for preventing the mixture of the transmission signal of the transmission frequency $f_1$ into the reception signal of the reception frequency $f_2$ can be omitted, and the high frequency amplifier as well as the frequency mixer can be omitted, too. Moreover, since the input/output resonance circuit exhibiting substantially the resonance characteristics to both the reception frequency $f_1$ and the reception frequency $f_2$ is used in common for the resonance circuit forming the antenna coupling circuit of the transmitter and the antenna coupling circuit of the receiver, one of the antenna coupling circuits can be eliminated.

The above and other features and advantages of the present invention will become more apparent from the following description of the embodiments thereof when taken in conjunction with the accompanying drawings.

DESCRIPTION OF THE PREFERRED EMBODIMENTS

Figure 1:
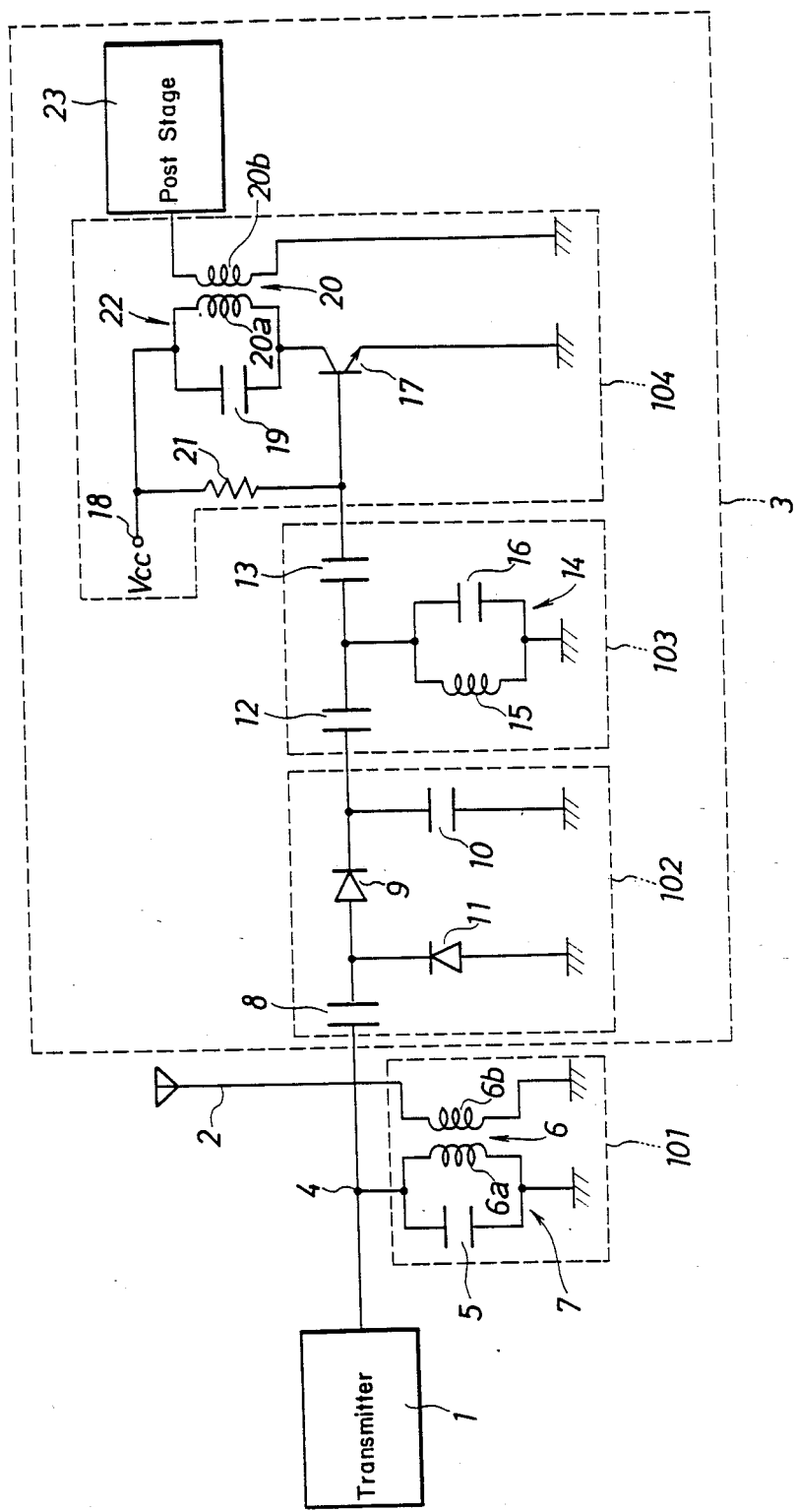
FIG. 1 is a circuit diagram of a duplex communication wireless in accordance with a first embodiment of the present invention.

Referring initially to FIG. 1, the duplex communication wireless in accordance with the present invention comprises a transmitter 1, an antenna 2, an antenna coupling circuit 101 and a receiver 3. The receiver 3 comprises a frequency conversion circuit 102, a band-pass filter 103, an intermediate frequency (IF) amplification circuit 104 and a post-stage 23 of the receiver which consists of a demodulator, a low frequency amplifier, a speaker, and the like.

The transmitter 1 is constructed such that it amplifies the signal wave outputted from a microphone or modulates the carrier wave outputted from an oscillator by the signal wave described above, power-amplifies this modulated wave and outputs a transmission signal of a transmission frequency $f_1$ to the antenna 2. The output terminal of the transmitter 1 is connected through a node 4 to a parallel resonance circuit 7 consisting of a capacitor 5 and a primary coil $6a$ of a transformer 6, and the secondary coil $6b$ of the transformer 6 is connected to the antenna 2. The capacitor 5 and the transformer 6 together constitute the antenna coupling circuit 101. The resonance frequency of the parallel resonance circuit 7 is set so that the resonance circuit 7 exhibits substantially its resonance characteristics for both the transmission frequency $f_1$ and the reception frequency $f_2$, and the transmission signal of the transmission frequency $f_1$ outputted from the transmitter 1 can be supplied efficiently to the antenna 2 by the antenna coupling circuit 101. The transmission signal of the transmission frequency $f_1$ is radiated as a radio wave from the antenna 2 and is also inputted to the frequency conversion circuit 102 constituting the receiver 3 through the node 4.

The antenna coupling circuit 101 functions as the output resonance circuit of the transmitter 1 and also as the input resonance circuit of the receiver 3 which inputs selectively the radio waves of the reception frequency f2. Incidentally, the parallel resonance circuit 7 constitutes the input/output resonance circuit described above.

The frequency conversion circuit 102 consists of a capacitor 8 connected to the node 4, a point contact diode 9 whose cathode is connected to the output terminal of the capacitor 8, a capacitor 10 connected to the anode of the point contact diode 9 and a point contact diode 11 whose anode is connected to the output terminal of the capacitor 8.

When the transmission signal of the transmission frequency f1 outputted from the transmitter 1 and the reception signal of the reception frequency f2 are simultaneously inputted thereto through the antenna 2 and the antenna coupling circuit 101 due to the square characteristics of the point contact diodes 9 and 11, the frequency conversion circuit 102 outputs signals containing also a signal of an intermediate frequency component $|f1 \pm f2|$ to a band-pass filter 103 connected to a next stage.

The band-pass filter 103 consists of a capacitor 12 connected to the anode of the point contact diode 9, a capacitor 13 connected to the output terminal of the capacitor 12 and a coil 15 and a capacitor 16 that are connected to the output terminal of the capacitor 12 and constitute a parallel resonance circuit 14. The resonance frequency of this parallel resonance circuit 14 is set to either one of the intermediate frequencies $|f1 \pm f2|$, and to $|f1 - f2|$ in this embodiment.

This band-pass filter 103 extracts only the signal of the intermediate frequency component $|f1 - f2|$ among the output signals of the frequency conversion circuit 102 and outputs it to an intermediate frequency amplification circuit 104 connected to the next stage. Incidentally, the frequency conversion circuit 102 and the band-pass filter 103 together constitute the reception input circuit described above.

The intermediate frequency amplification circuit 104 consists of a transistor 17 whose base is connected to the output terminal of the capacitor 13 and whose emitter is grounded. A capacitor 19 inserted between the collector of the transistor 17, and a power source 18 and a resistor 21 inserted between a transformer 20, the power source 18 and the base of the transistor 17 also form parts of the intermediate frequency amplification circuit 104. The capacitor 19 and the primary coil 20a of the transformer 20 together constitute a parallel resonance circuit 22 that resonates with the intermediate frequency $|f1 - f2|$. The secondary coil 20b of the transformer 20 is connected to the input terminal of the post stage 23 of the receiver consisting of a demodulator, a low frequency amplifier, a speaker, and the like. This intermediate frequency amplification circuit 104 amplifies the signal of the intermediate frequency component $|f1 - f2|$ and outputs it to the post stage 23 of the receiver.

Next, the operation of this embodiment will be described.

In the construction described above, the transmitter 1 outputs the transmission signal of the transmission frequency f1 to the antenna coupling circuit 101 and to the frequency conversion circuit 102 forming the receiver 3. The transmission signal of the transmission frequency f1 outputted from the transmitter 1 and the reception signal of the reception frequency f2 inputted through the antenna 2 and the antenna coupling circuit 101 are simultaneously inputted to the frequency conversion circuit 102, and the frequency conversion circuit 102 outputs the signals containing the signal of the intermediate frequency components $|f1 \pm f2|$ obtained as the sum and difference components of the transmission frequency and the reception frequency.

Next, the band-pass filter 103 extracts only the signal of the intermediate frequency component $|f1 - f2|$ from the output signals of the frequency conversion circuit 102 and outputs it to the intermediate frequency amplification circuit 104. This circuit 104 amplifies the signal of the intermediate frequency component $|f1 - f2|$ and outputs it to the post stage 23 of the receiver.

In the post stage 23 of the receiver, the demodulator demodulates the signal of the intermediate frequency component $|f1 - f2|$ to reproduce the signal wave, and the low frequency amplifier amplifies this signal. The amplified signal wave is outputted as an audio signal from the speaker.

In this manner, it is possible to extract the signal of the intermediate frequency component $|f1 - f2|$ by use of the frequency conversion circuit 102 and the band-pass filter 103 by utilizing the transmission signal of the transmission frequency f1 outputted from the transmitter 1 but without using any high frequency amplifier and frequency mixer, and to reproduce the signal wave by demodulating the signal of this intermediate frequency component $|f1 - f2|$.

In accordance with the structure of this embodiment, the signal wave can be reproduced even when the transmission frequency f1 and the reception frequency f2 are very close to each other.

As described above, since the receiver 3 is constructed in such a manner that the transmission signal of the transmission frequency f1 outputted from the transmitter 1 is inputted to the receiver 3 so as to obtain the signal of the intermediate frequency component, it is possible to omit a filter which prevents the inflow of the transmission signal of the transmission frequency f1 into the receiver 3.

Since the signal of the intermediate frequency component is extracted by the reception input circuit consisting of the frequency conversion circuit 102 and the band-pass filter 103, the high frequency amplifier and the frequency mixer can be omitted.

Furthermore, since the antenna coupling circuit of the transmitter 1 and the antenna coupling circuit of the receiver 3 are borne by one antenna coupling circuit 101, one antenna coupling circuit can be eliminated in comparison with the conventional duplex communication wireless.

Therefore, it is possible to accomplish cost-down by drastic reduction of the number of components, and the reduction of both size and weight. Since there is only one antenna coupling circuit, adjustment becomes easier.

Though the resonance frequency of the parallel resonance circuit 14 constituting the band-pass filter 103 is set to the intermediate frequency $|f1 - f2|$ in this embodiment, the resonance frequency can be set to the intermediate frequency $|f1 + f2|$, as well. In this case, the resonance frequency of the parallel resonance frequency circuit 22 constituting the intermediate frequency amplifier 104 is also set to the intermediate frequency $|f1 + f2|$.

It is also possible to use Schottky barrier diodes in place of the point contact diodes 9, 11 forming the frequency conversion circuit 102.

Figure 2:
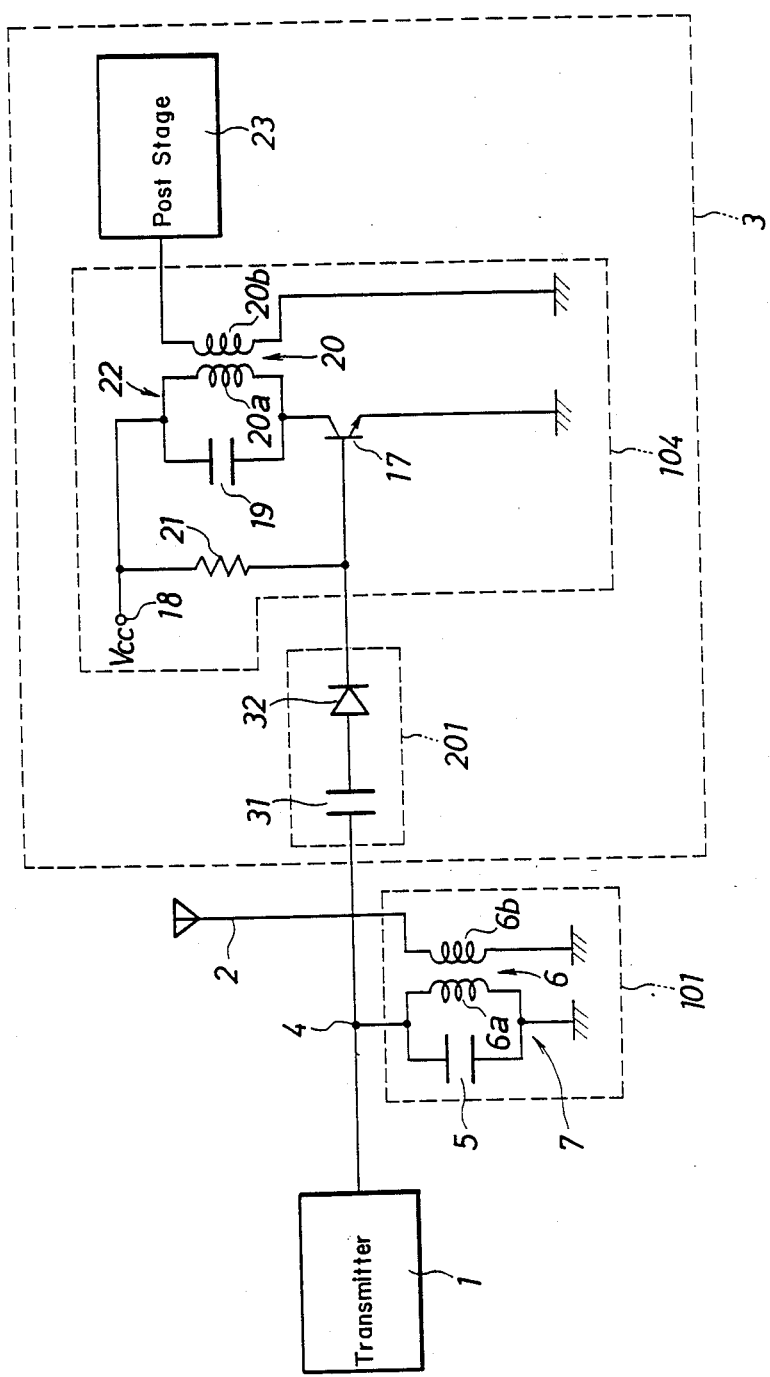
FIG. 2 is a circuit diagram of the duplex communication wireless in accordance with a second embodiment of the present invention.

FIG. 2 is a circuit diagram of the duplex communication wireless in accordance with the second embodiment of the present invention. In FIG. 2, like reference numerals are used to identify like constituents as in FIG. 1 and their explanation will be omitted.

As shown in FIG. 2, the duplex communication wireless consists of the transmitter 1, the antenna 2, the antenna coupling circuit 101 and the receiver 3, and the receiver 3 consists of the frequency conversion circuit 201, the intermediate frequency amplification circuit 104 and the post stage 23 of the receiver.

The frequency conversion circuit 201 consists of a capacitor 31 connected to the node 4 and a point contact diode 32 whose cathode is connected to the output terminal of the capacitor 31. In this embodiment, frequency conversion is accomplished by the square (or quadratic) characteristics of the point contact diode 32.

In the construction described above, the transmitter 1 outputs the transmission signal of the transmission frequency f1 to the antenna coupling circuit 101 and the frequency conversion circuit 201 forming the receiver 3. The transmission signal of the transmission frequency f1 outputted from the transmitter 1 and the reception signal of the reception frequency f2 inputted through the antenna 2 and the antenna coupling circuit 101 are simultaneously applied to the frequency conversion circuit 201 and this circuit 201 outputs the signals containing the signal of the intermediate frequency component $|f1\pm f2|$ obtained as the sum and difference components of the transmission signal of the transmission frequency f1 and the reception signal of the reception frequency f2, to the intermediate frequency amplification circuit 104.

The intermediate frequency amplification circuit 104 amplifies the output signal of the frequency conversion circuit 201, extracts only the signal of the intermediate frequency component $|f1-f2|$ and outputs it to the post stage 23 of the receiver 3.

In the post stage 23 of the receiver, the demodulator demodulates the signal of the intermediate frequency component $|f1-f2|$ to reproduce the signal wave, and the low frequency amplifier amplifies this signal wave. The amplified signal wave is outputted as an audio signal from the speaker.

In this embodiment, the frequency conversion circuit 201 consists of two devices, i.e. the capacitor 31 and the point contact diode 32 and the band-pass filter 103 used in the first embodiment is omitted. Therefore, the number of components can be reduced more than in the first embodiment and the cost-down and reduction of both size and dimension can be further accomplished. Since there is only one antenna coupling circuit, in the same way as in the first embodiment, adjustment becomes easier.

Figure 3:
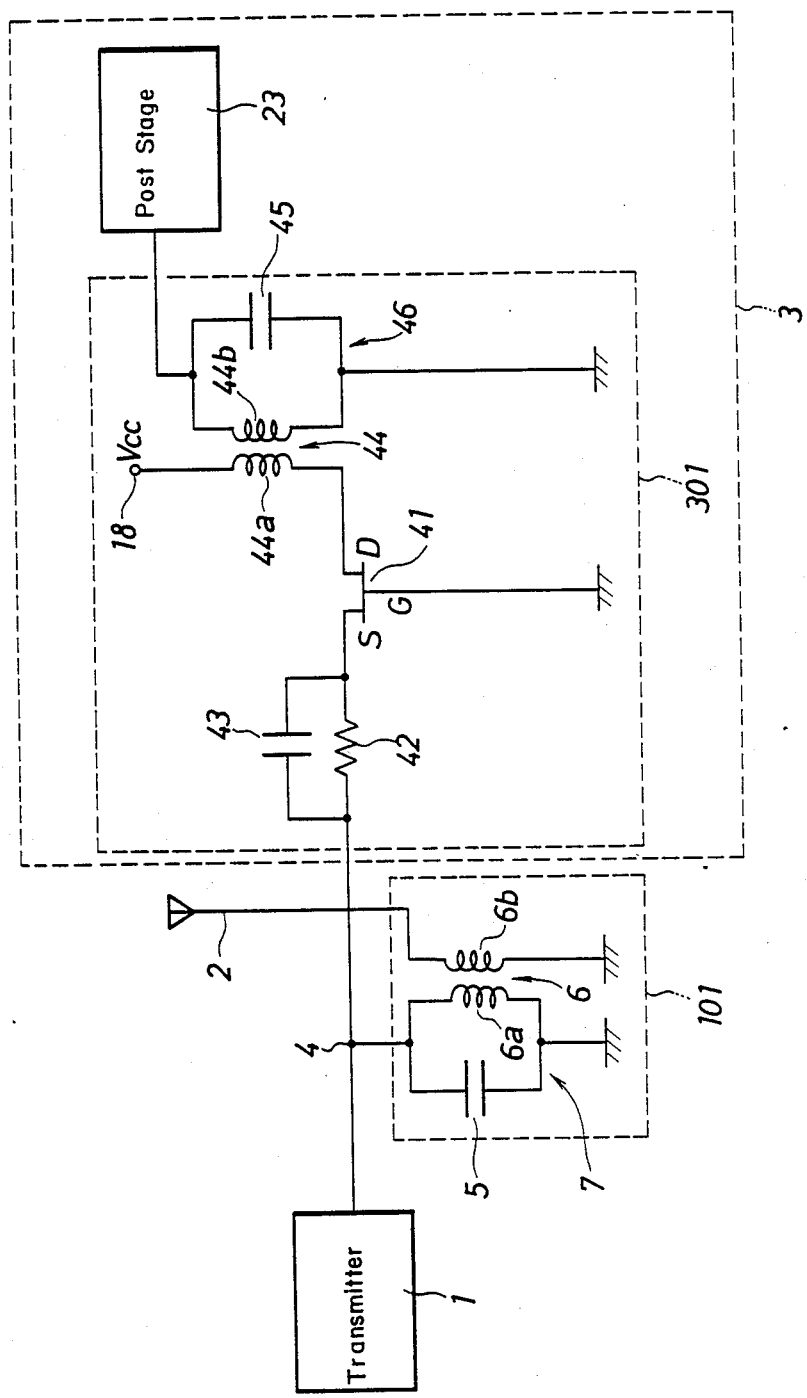
FIG. 3 is a circuit diagram of the duplex communication wireless in accordance with a third embodiment of the present invention.

FIG. 3 is a circuit diagram of the duplex communication wireless in accordance with the third embodiment of the present invention. In FIG. 3, like reference numerals are used to identify like constituents as in FIG. 1 and their explanation will be omitted. Incidentally, it is possible to use a Schottky barrier diode in place of the point contact diode constituting the frequency conversion circuit 201.

As shown in FIG. 3, the duplex communication wireless comprises the transmitter 1, the antenna 2, the antenna coupling circuit 101 and the receiver 3, and the receiver 3 consists of the intermediate frequency amplification circuit 301 and the post stage 23 of the receiver.

The intermediate frequency amplification circuit 301 consists of a field effect transistor 41 whose gate is grounded, a resistor 42 connected between the source of the field effect transistor 41 and the node 4, a capacitor 43 connected in parallel with the resistor 42, a transformer 44 and a capacitor 45. The primary coil 44a of the transformer 44 is connected between the drain of the field effect transistor 41 and the power source 18, and the secondary coil 44b of the transformer 44 and the capacitor 45 together from a parallel resonance circuit 46 whose resonance frequency is set to the intermediate frequency $|f1-f2|$. This parallel resonance circuit 46 is connected to the post stage 23 of the receiver and frequency conversion is accomplished by the square characteristics of the field effect transistor 41.

In the circuit construction described above, the transmitter 1 outputs the transmission signal of the transmission frequency f1 to the antenna coupling circuit 101 and the intermediate frequency amplification circuit 301 forming the receiver 3. The transmission signal of the transmission frequency f1 outputted from the transmitter 1 and the reception signal of the reception frequency f2 inputted through the antenna 2 and the antenna coupling circuit 101 are simultaneously applied to the intermediate frequency amplification circuit 301. This intermediate frequency amplification circuit 301 amplifies the signals containing the signal of the intermediate frequency component $|f1\pm f2|$ obtained as the sum and difference components of the transmission signal of the transmission frequency f1 and the reception signal of the reception frequency f2, and the parallel resonance circuit 46 extracts only the signal of the intermediate frequency component $|f1-f2|$ and outputs it to the post stage 23 of the receiver 23.

In the post stage 23 of the receiver, the demodulator demodulates the signal of the intermediate frequency component $|f1-f2|$ to reproduce the signal wave, and the amplified signal wave is outputted as an audio signal from the speaker. This embodiment, too, exhibits the same action and effect as that of the first embodiment.

What is claimed is:

1. A duplex communication wireless apparatus of the type comprising transmitting means outputting a transmission signal at a transmission frequency f1, receiving means inputting a reception signal at a reception frequency f2 and sole antenna means connected to said transmitting means and said receiving means, wherein the sum or difference component of the transmission frequency f1 and the reception frequency f2 becomes an intermediate frequency of a receiver, comprising:

a sole input/output resonance circuit connected to said transmitting means, said receiving means and said antenna means and exhibiting resonance substantially with the transmission frequency f1 and the reception frequency f2; and said receiving means comprising a first means for supplying simultaneously both said transmission signal at the transmission frequency f1 from a transmitter and said reception signal at the reception frequency f2 inputted through said antenna means and said input/output resonance circuit to a cathode of a diode, a second means for extracting an intermediate frequency component signal of $|f1\pm f2|$ among output signals from anode of said diode and a third means for demodulating said intermediate frequency component signal.

2. The duplex communication wireless apparatus as defined in claim 1, wherein said first means includes a frequency conversion circuit having a quadratic input/output characteristic, said frequency conversion circuit connected to said input/output resonance circuit for outputting intermediate frequency signals of frequencies $|f1\pm f2|$, and said second means includes a resonance circuit resonating with one of said frequencies $|f1\pm f2|$ to extract said one frequency from said output of said frequency conversion circuit.

3. A duplex communication wireless apparatus of the type wherein the sum or difference component of the transmission frequency f1 and the reception frequency f2 becomes an intermediate frequency of a receiver, comprising:
an input/output resonance circuit exhibiting resonance substantially with said transmission frequency f1 and said reception frequency f2; and
a reception input circuit adapted to receive simultaneously both said transmission signal at the transmission frequency f1 from a transmitter and said reception signal at the reception frequency f2 inputted through said input/output resonance circuit for conversion into an intermediate frequency component signal including frequencies of $|f1\pm f2|$ and to produce an output including said intermediate frequency component signal,
wherein said reception input circuit includes a frequency conversion circuit having a quadratic input/output characteristic, said frequency conversion circuit connected to said input/output resonance circuit for outputting said frequencies of said intermediate frequency component signal, and a resonance circuit resonating with one of said frequencies $|f1\pm f2|$ to extract said one frequency from said output of said frequency conversion circuit,
said reception input circuit comprising a point contact diode having a quadratic characteristic for generating said intermediate frequency component signal from said transmission and reception frequencies.

4. A duplex communication wireless apparatus of the type wherein the sum or difference component of the transmission frequency f1 and the reception frequency f2 becomes an intermediate frequency of a receiver, comprising:
an input/output resonance circuit exhibiting resonance substantially with said transmission frequency f1 and said reception frequency f2; and
a reception input circuit adapted to receive simultaneously both said transmission signal at the transmission frequency f1 from a transmitter and said reception signal at the reception frequency f2 inputted through said input/output resonance circuit for conversion into an intermediate frequency component signal including frequencies of $|f1\pm f2|$ and to produce an output including said intermediate frequency component signal,
wherein said reception input circuit includes a frequency conversion circuit having a quadratic input/output characteristic, said frequency conversion circuit connected to said input/output resonance circuit for outputting said frequencies of said intermediate frequency component signal, and a resonance circuit resonating with one of said frequencies $|f1\pm f2|$ to extract said one frequency from said output of said frequency conversion circuit,
said reception input circuit comprising a Schottky barrier diode having a quadratic characteristic for generating said intermediate frequency component signal from said transmission and reception frequencies.

5. The duplex communication wireless apparatus as defined in claim 1, further comprising a single antenna coupling circuit means for coupling both said receiving means and the transmitting means of said apparatus to said sole antenna means.

6. A duplex communication wireless apparatus as defined in claim 1, comprising an antenna coupling circuit means, said transmitting means and said receiving means each connected to a common node of said antenna coupling circuit means for coupling both said receiving means and said transmitting means to said sole antenna means.

7. A duplex communication wireless apparatus of the type comprising transmitting means outputting a transmission signal at a transmission frequency f1, receiving means inputting a reception signal at a reception frequency f2 and sole antenna means connected to said transmitting means and said receiving means, wherein the sum or difference component of the transmission frequency f1 and the reception frequency f2 becomes an intermediate frequency of a receiver, comprising:
a sole input/output resonance circuit connected to said transmitting means, said receiving means and said antenna means and exhibiting resonance substantially with the transmission frequency f1 and the reception frequency f2; and
said receiving means comprising a first means for supplying simultaneously both said transmission signal at the transmission frequency f1 from a transmitter and said reception signal at the reception frequency f2 inputted through said antenna means and said input/output resonance circuit to a source of a field effect transistor whose gate is grounded, a second means for extracting an intermediate frequency component signal of $|f1\pm f2|$ among output signals from a drain of said field effect transistor and a third means for demodulating the intermediate frequency component signal,
thereby reducing cross modulation of frequencies of said transmission and reception signals even for transmission signal energy greater than reception signal energy, whereby an attenuating filter for said transmission signal is eliminated.

8. The duplex communication wireless apparatus as defined in claim 7, wherein said first means includes a frequency conversion circuit having a quadratic input/output characteristic, said frequency conversion circuit connected to said input/output resonance circuit for outputting intermediate frequency signals of frequencies $|f1\pm f2|$, and said second means includes a resonance circuit resonating with one of said frequencies $|f1\pm f2|$ to extract said one frequency from said output of said frequency conversion circuit.

* * * * *